(12) United States Patent
Fernandes et al.

(10) Patent No.: US 11,008,822 B2
(45) Date of Patent: May 18, 2021

(54) OPERATIONAL SYSTEM FOR LAUNCHING, MANAGING AND CONTROLLING A ROBOT AUTONOMOUS UNIT (RAU) FOR OPERATIONS IN OIL AND GAS WELLS AND METHOD OF WELL LOGGING

(71) Applicant: INSFOR—INNOVATIVE SOLUTIONS FOR ROBOTICS LTDA.—ME, Rio de Janeiro (BR)

(72) Inventors: Paulo Doré Fernandes, Niteroi (BR); Julio Quadrio de Moura, Rio de Janeiro (BR); Alexandre Ormiga Galvão Barbosa, Rio de Janeiro (BR); Daniel Zacarias Freitas, Rio de Janeiro (BR)

(73) Assignee: INSFOR—INNOVATIVE SOLUTIONS FOR ROBOTICS LTDA.—ME, Rio de Janeiro (BR)

( * ) Notice: Subject to any disclaimer, the term of this patent is extended or adjusted under 35 U.S.C. 154(b) by 0 days.

(21) Appl. No.: 15/760,443

(22) PCT Filed: Mar. 13, 2018

(86) PCT No.: PCT/BR2018/050066
§ 371 (c)(1),
(2) Date: Aug. 14, 2018

(87) PCT Pub. No.: WO2019/119083
PCT Pub. Date: Jun. 27, 2019

(65) Prior Publication Data
US 2020/0300053 A1 Sep. 24, 2020

(30) Foreign Application Priority Data
Dec. 18, 2017 (BR) ............ 2017 027366-0

(51) Int. Cl.
*E21B 23/00* (2006.01)
*E21B 23/08* (2006.01)
(Continued)

(52) U.S. Cl.
CPC ............ *E21B 23/001* (2020.05); *E21B 23/08* (2013.01); *E21B 44/00* (2013.01); *E21B 47/09* (2013.01);
(Continued)

(58) Field of Classification Search
CPC ........ E21B 23/001; E21B 47/09; E21B 44/00; E21B 23/08; F16L 55/46; F16L 55/38;
(Continued)

(56) References Cited

U.S. PATENT DOCUMENTS 6,405,798 B1 6/2002 Barrett et al.
6,446,718 B1 10/2002 Barrett et al.
(Continued)

*Primary Examiner* — Brad Harcourt
(74) *Attorney, Agent, or Firm* — Malin Haley DiMaggio & Bowen, P.A.

(57) ABSTRACT

An operational system for an oil well wellhead for launching, managing and controlling a robotic autonomous unit (RAU) is described, said system comprising a) main body for housing said RAU, a lower safety valve, an upper safety valve, a connector for connection with the well head and an end cap for communication with said RAU; b) a PMD unit for programming, managing and data collection; and c) at the ground surface, a unit for remote transmission and reception, for receiving information collected by said PMD unit. The method for well logging with the aid of said operational system is also described.

2 Claims, 5 Drawing Sheets

INVENTION

(51) Int. Cl.
*E21B 44/00* (2006.01)
*E21B 47/09* (2012.01)
*F16L 55/32* (2006.01)
*F16L 55/38* (2006.01)
*F16L 55/46* (2006.01)
*G01V 1/52* (2006.01)
*G01V 3/18* (2006.01)
*G01V 11/00* (2006.01)

(52) U.S. Cl.
CPC ............... *F16L 55/32* (2013.01); *F16L 55/38* (2013.01); *F16L 55/46* (2013.01); *G01V 1/52* (2013.01); *G01V 3/18* (2013.01); *G01V 11/002* (2013.01)

(58) Field of Classification Search
CPC ......... F16L 55/32; G01V 11/002; G01V 3/18; G01V 1/52
See application file for complete search history.

(56) References Cited

U.S. PATENT DOCUMENTS

| | | |
|---|---|---|
| 6,845,819 B2 | 1/2005 | Barrett et al. |
| 9,528,348 B2 | 12/2016 | Miller |
| 2004/0123984 A1* | 7/2004 | Vail, III .................. E21B 10/64 166/291 |

* cited by examiner

STATE OF THE ART

STATE OF THE ART

INVENTION

INVENTION

FLOWCHART

OPERATIONAL SYSTEM FOR LAUNCHING, MANAGING AND CONTROLLING A ROBOT AUTONOMOUS UNIT (RAU) FOR OPERATIONS IN OIL AND GAS WELLS AND METHOD OF WELL LOGGING

FIELD OF THE INVENTION

The present invention belongs to the field of equipment designed for operations in oil and gas wells, more specifically, to an operational system for launching, managing and controlling an autonomous robot unit for operations in oil and gas wells. The invention is also related to well logging and installation and uninstallation method of subsurface equipment with the aid of said system.

BACKGROUND INFORMATION

Well logging is a technique for detection and recording of properties and characteristics of the geological formations traversed by a well by means of the measurement of the physical properties of these formations, performed by tools descended into the well usually by means of a logging wire (wireline), see Harald Bolt, Wireline Depth Determination, Rev 3.3, April 2012, available via Society of Professional Well Log Analysts at the web site www.spwla.org.

Some logging operations can be performed during several phases of the well useful life, either during drilling, completion, production or abandonment of said well.

Logging can be performed in oil and/or gas, production or injection wells, aiming at supporting technical or environmental studies.

Well logging is a well-established technique in the oil industry, being operated and developed since the nineteen twenties. In Sep. 5, 1927, the first recorded logging operation was performed by Schlumberger in a well in Pechelbronn (France) by means of an electrical logging tool which aimed at measuring the rocks' electrical resistivity.

Since the development of the logging technique by the oil industry the most widely employed method for descending the well logging tool is by an electrical cable or wireline which is responsible for the descent and withdrawal of the logging tool from the well, as well as by data and energy transmission between the surface and the logging tool.

Nowadays, many wells are directionally drilled, with long inclined or horizontal sections. In order to make the logging tools cross over these sections, in the beginning drill pipes or coiled tubing were used. According to present techniques, logging tools can be coupled to the drill pipe itself, the information being continuously conveyed to the surface during the well drilling, through the drilling fluid itself. These techniques are known as "Logging While Drilling" (LWD) and "Measurement While Drilling" (MWD).

Another option for the descent of logging tools into inclined or horizontal wells by means of wires is the use of a tractor coupled to the logging tool, the tractor making it possible to displace the logging tool along the inclined or horizontal well section.

The conventional wireline logging method comprises the combination of three units:

At the surface, a central processing unit, in charge of supplying energy to the logging tool as well as by the communication and collection of data recorded by the tool;

Also at the surface, a traction unit (winch), combined to the central processing unit, and in charge of descending and lifting the logging tool from the surface to the bottom well and vice-versa, so that the logging tool crosses the well intervals which are to be investigated or from which information is to be gathered; and Bottomhole tool (logging tool) which is descended into the well by wireline, the tool being made up of apparatuses of different operating principles (acoustic, radioactive, electrical, thermal, magnetic or optical), and can also be coupled to one or more flow meters for flow measurement and pressure sensors for collecting information from the rocks traversed by the well such as permo-porous properties, mechanical properties, oil, gas and water saturations, as well as production flows of different intervals.

The wire logging technique makes use of one safety equipment at the surface (cable BOP) so as to promote sealing of the well in case of undesired flow of fluids from the bottom to the surface so as to enable withdrawal of the logging tool by wireline without allowing the well to flow.

FIG. 1 attached shows a schematics of the wireline logging process as practiced in the state-of-the-art technique. A logging unit 1 positioned at the surface comprises a central processing unit 2 including computerized system for collection, storage and data analysis as well as a source of electrical energy for supplying electricity to the logging tool 6. The surface unit further includes a winch (cable traction system) 3. At the wellhead (not represented) a safety equipment is installed, also known as cable BOP 4 which can further include a lubricant system to enable the withdrawal of the logging wireline 5 while the well is under flow. The logging wireline 5 is in charge of the descent of the logging tool 6 along the well, the well 7 wall being a casing or the contact surface itself between the well and the rock traversed by the well, this characterizing open well completion. The logging tool 6 which may follow several operation principles, measuring specific properties of the rocks traversed by well 7 and of the hydrocarbon- and/or water-bearing zones of interest 8.

FIG. 2 attached shows another well-known technique to descend logging tools into a well, in case, a high inclination well. Thus, a logging tool 6 is descended by wireline 5 and coupled to a tractor 9 to cross a high inclination or horizontal well 10 section.

The oil and gas industry makes use of wireline logging to obtain a continuous record of the properties of rocks traversed by the well. Wireline logging can be defined as the acquisition and analysis of geophysical data as a function of wellbore depth, together with the provision of related services. Measurements are performed by reference to the wellbore depth and can be used to infer other properties such as fluid saturation and permo-porous properties, as well as to aid in the making of decisions on drilling and well production.

Logging tools record different petrophysical properties of rocks using a variety of working principles. The developed logging tools are based on the rocks' natural gamma ray detection and on its electrical and acoustic properties. The logging tools record also the rock response towards radioactive, electromagnetic, nuclear magnetic resonance stimuli besides other properties. Such logging tools are specified by the main property on which is based their working principle.

Data are recorded at the surface in real time in an electronic data format and then a printed record or electronic presentation called "log" is supplied to the client, together with an electronic copy of the raw data.

Well logging operations can be performed during some steps of the drilling process in order to provide information on the formations traversed by the wellbore, or at the end of the drilling, after the zone of interest is attained. Data are recorded directly against the measured wireline depth.

The measured wireline depth can be derived from a number of different measurements, but it is generally recorded on the basis of a gauged wheel counter, or utilizing magnetic marks which provide gauged increments sized by the wireline length.

As for the logging by means of autonomous units, during the nineteen nineties a few robot systems were patented, those being launched by wireline or directly from the surface to perform a few operations inside the well bore, including a few logging services.

These patents, however, do not disclose any surface system directed to the launching of autonomous units in order to secure the safety of the well in case of any undesirable flow occurrence during the operation.

Further, such patents do not consider performing activities in operating wells, either oil and/or gas production, or water, vapor or chemicals injection, nor either the logging of varying diameter along the borehole path and wells completed with production tubing.

Since the nineteen nineties, a few patents were published, directed to the utilization of robot autonomous systems for performing logging or different operations in petroleum oil wells, however, all the known systems are launched with the aid of state-of-the-art systems, that is, wireline, coiled tubing or tractor.

U.S. Pat. No. 6,446,718 relates to a well tool for the logging and/or correction operations in a well. The tool comprises an autonomous, controlled unit for the measurement of the well conditions. The autonomous unit comprises displacement means for providing movement along the well bore, means for detecting the well bore conditions and logic means for controlling the unit. Logic in the context of the present Application means to be able to make decisions based on at least two input parameters. It can be connected to a fixed unit at the surface or launched from the surface. The connecting system between the two units can be repeatedly operated under bottom well conditions and, preferably, includes an active component for disengagement. The strongest emphasis of said U.S. Pat. No. 6,446,718 is toward a logging tool that, having been descended by wireline, is able to cross a horizontal section or a high inclination section of the well by means of a tractor coupled to the logging tool.

U.S. Pat. Nos. 6,845,819 and 6,405,798 are similar to U.S. Pat. No. 6,446,718. These documents relate to a robot unit for displacement in petroleum oil wells aiming at performing repairs or various logging operations. The contents of the specification lead to the conclusion that the described invention is directed to cased wells, without tube strings and without any diameter variation along the well path.

U.S. Pat. No. 9,528,348B2 is directed to a power unit launching system to supply a bottom tool, descended by wireline or coiled tubing.

Due to the launching systems employed which all belong to the state-of-the-art technique, recent patent documents related to autonomous units to perform operations in wells do not encompass various possibilities such as operate in an active well (production or injection) equipped with tubing, variable diameter along the well path, open-hole or barefoot completion (without casing) and with sand control screens. Besides, the existing launching systems are not able to assure the safety of the well in case of some undesirable flow from the well that might occur during operation.

SUMMARY OF THE INVENTION

The invention refers to an operational launching, managing and controlling system of an autonomous unit for operations in oil and gas wells, said autonomous unit including a bottom tool for performing logging operations and several services in oil and/or gas producing wells and injection wells.

The invention refers further to a method of well logging with the aid of the system of the invention.

The autonomous unit of the invention is directed to performing any subsurface operation in petroleum wells, for the record, collection and transmission of data both from the wellbore and the geological formations.

The petroleum and gas wells which are the objects of the operations are producing or injection wells. Wells are in operation or under overbalanced condition, and in any kind of completion, both for open-hole or cased well, cemented and perforated. Wells are vertical, horizontal or inclined. The well diameter is fixed or variable along the path of the autonomous unit.

The autonomous unit and method of operation of same in order to perform well operations according to the invention is operational without withdrawing the Christmas Tree from the well, that is, it is possible to perform the logging or service while the well is in operation (production or injection).

The robot autonomous unit (RAU) of the invention for performing logging operations and installation or uninstallation of well equipment comprises:

a) a power driven traction unit able to self-adjust to the well diameter, made up of a set of electrical motors and transmission components in a mechanical structure able to self-adjust to different diameters along the well with the aid of sensors directed to the identification of the well diameter variation;

b) a processing and controlling unit, in charge of the whole of the data processing and robotic system control, making data acquisition in real time of the RAU on-board sensors, processing such data and conveying the processed data to the control system, thus allowing the RAU to operate in autonomous way;

c) a battery unit, in charge of the RAU and its components electric supply in order to provide the energy required for the performance of a complete RAU operation in the well;

d) a buoyance compensation chamber for aiding the robotic system in its return to surface at the end of each operation;

e) at the surface, a programming, managing and data collection unit, comprising a portable computer having an interface to the mast End Cap and being connected to said launching mast;

f) a remote data transmission and reception system, for performing the transmission of the information collected by said programming, managing and data collection to a remote monitoring and control base;

g) a flow rate recording device coupled to RAU;

h) a pressure recording electronic sensor coupled to RAU;

i) a temperature recording electronic sensor coupled to RAU;

j) electronic sensors, at the RAU upper and lower ends for well diameter determination; and k) a rescue system for recovery of the tool in case of malfunction or stucking within the well.

Alternatively, the RAU includes different logging tools according to various operating principles besides those already cited in items g) through j).

The present invention relates further to the well logging method performed with the aid of the system of the invention.

The present system comprises a launching mast, programming and managing system, a robot autonomous unit (RAU) and a remote data transmission system or unit.

Broadly, the operational system for launching, managing and controlling an autonomous unit for operations in oil and gas wells, located on surface, comprises:

a) an autonomous unit launching mast which the object of Brazilian Application BR102017017526-0 (and corresponding international Application PCT/BR2017050275 and U.S. Ser. No. 15/572,260), said mast housing and launching the said robot autonomous unit and being supplied with an End Cap; the said mast being able to withstand the working pressures of the wellhead, in accordance with the safety standards b) a programming, managing and data collection unit; and c) a remote data transmission and reception unit.

And the method of the invention for well logging with the aid of the system of the invention comprises the following steps:

a) providing a launching mast 21, the upper end of which is supplied with an End Cap 23;

b) providing a programming, managing and data collection unit 25 for programming the operations to be performed by the RAU 200 and for collecting the data registered and stored in the memory of said RAU 200;

c) connecting the said launching mast 21 to said well Christmas Tree by means of a connector 18;

d) housing the RAU 200 in the interior of mast 21, with the upper safety valve 22 open and both the lower safety valve 20 and the swab valve 17 closed;

e) connecting said End Cap 23 to an electric system by any means, for charging the batteries of the RAU 200;

f) establishing contact between the programming, managing and data collection unit 25 and the RAU 200 and then conveying to the processing unit 28 of the RAU 200 the program of the operations to be performed in the well;

g) opening the lower safety valve 20 of mast 21 and the swab valve 17 of the Christmas Tree so as to allow the RAU 200 to move towards the well bottom to perform the operations for which it has been programmed, including logging operations or installation and uninstallation of subsurface equipment, the RAU 200 being able to move along the production or injection string, casing or open-hole well, up to the wellbore depth desired for the operation;

h) closing the lower safety valve 20 after the RAU enter the borehole;

i) automatically opening the lower safety valve 20 when the RAU 200 returns to surface and closing said safety valve 20 after the entry of RAU 200 into mast 21;

j) ending the ascending path of RAU 200 along the main body of mast 21 by housing said RAU in said End Cap 23;

k) collecting data obtained by said RAU 200, stored in the processing unit 28 memory during the well operation; and l) conveying data recorded by RAU 200 and collected by unit 25 for programming, managing and data collection towards a remote base 26 positioned at the surface.

Thus, the invention provides an operational system for programming, launching, operating and monitoring of an autonomous unit which makes it possible to perform logging and operations in oil and gas wells without the need of withdrawing the Christmas Tree from the well bore, as well as data treatment, either by an operator at the well location or positioned at an operation remote basis.

The invention provides further an operational system for programming, launching, monitoring and data collection of an autonomous unit which makes it possible to perform logging and operations in oil and gas wells for vertical, horizontal and inclined wells.

The invention provides still an operational system for programming, launching, monitoring and data collection of an autonomous unit which makes it possible to perform logging and operations in oil and gas wells, said system being operational with the well in flow.

The invention provides additionally an operational system for the programming, launching, monitoring and data collection of logging tools of any nature, either based on acoustic, electrical, magnetic, radioactive, optical or a combination of principles, such tools being conducted by an autonomous system housed in the present system.

The invention provides also an operational system for programming, launching, monitoring and data collection of an autonomous unit which makes it possible to perform logging and operations in oil and gas wells, such as open-hole wells, or cased, cemented and perforated wells, vertical, inclined or horizontal wells, of constant or variable diameter along their path.

The present invention provides further a well logging method with the aid of said operational system for programming, launching, monitoring and data collection of an autonomous unit.

DETAILED DESCRIPTION OF THE PREFERRED MODES OF THE INVENTION

Figure 1:
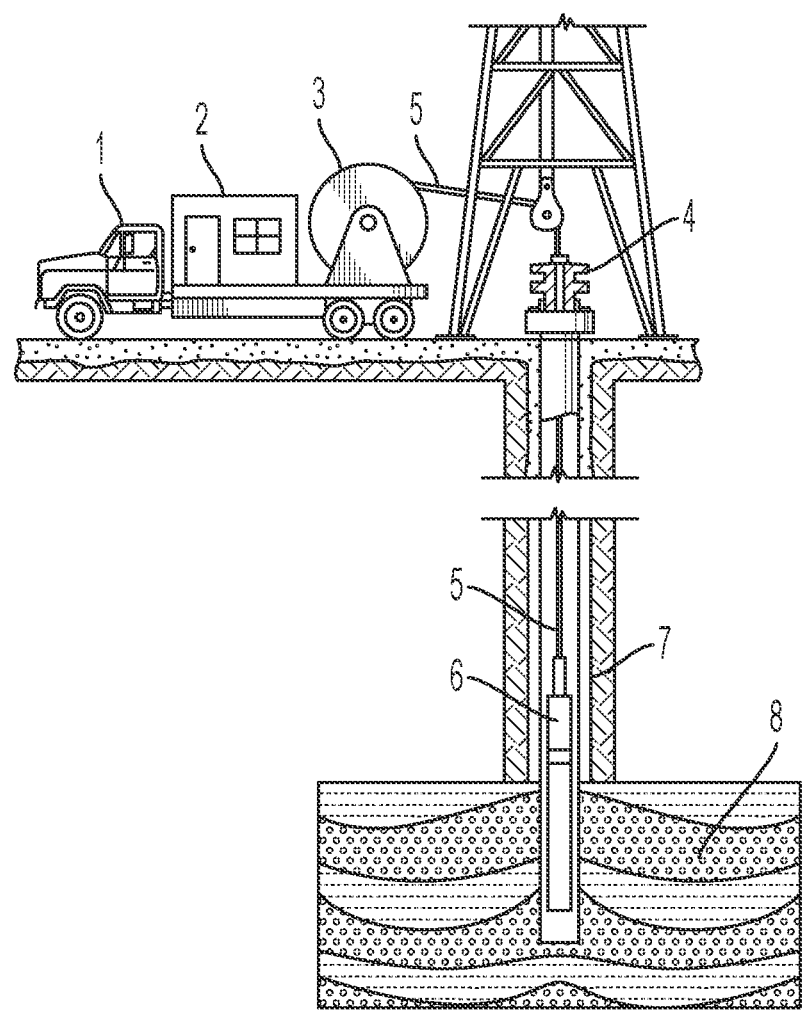
FIG. 1 is a schematic of the state-of-the-art wire logging process.
Figure 2:
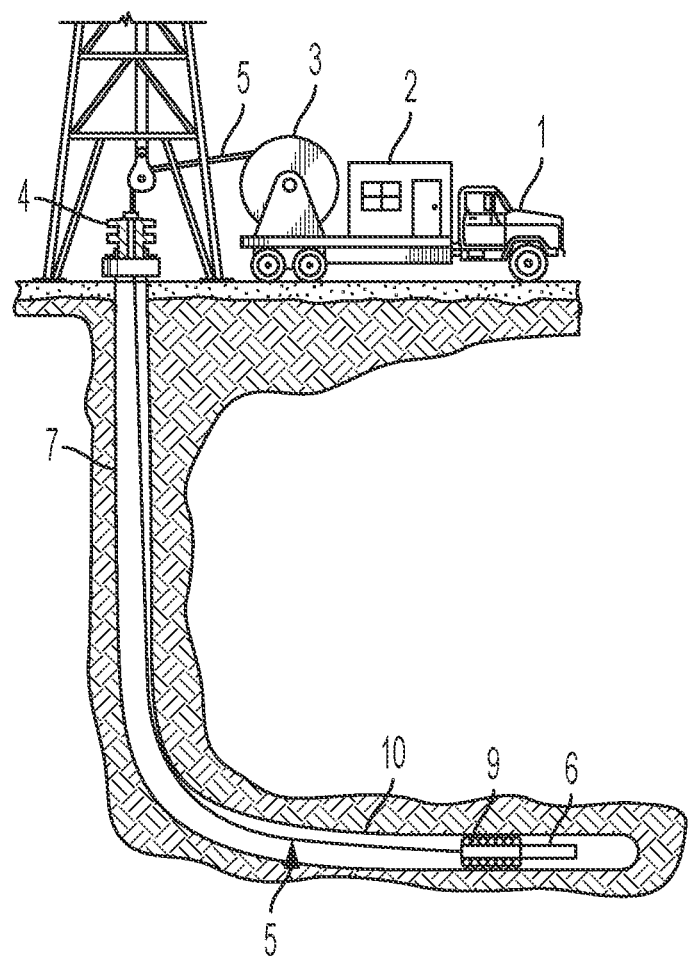
FIG. 2 is a logging tool, descended by wire and coupled to a tractor, directed to cross a high inclination or horizontal section of a well, also according to state-of-the-art processes.

Throughout the present specification, the terms "autonomous unit" or "autonomous tool" or yet, the abbreviation RAU, have equivalent meanings and as such are used indistinctively.

Still, throughout the present specification, the surface system is also called launching mast and therefore the above expressions operational launching system and launching mast or even mast should be considered as equivalent for the purposes of the invention.

The first aspect of the invention is the integrated system for the launching, managing and controlling the RAU. Such system comprises the launching mast including a RAU, programming, managing and data collection unit and control and monitoring central, the complete system being designated by reference numeral 100.

The present invention will be described below by reference to the attached Figures, which should not be considered as limiting same.

Figure 3:
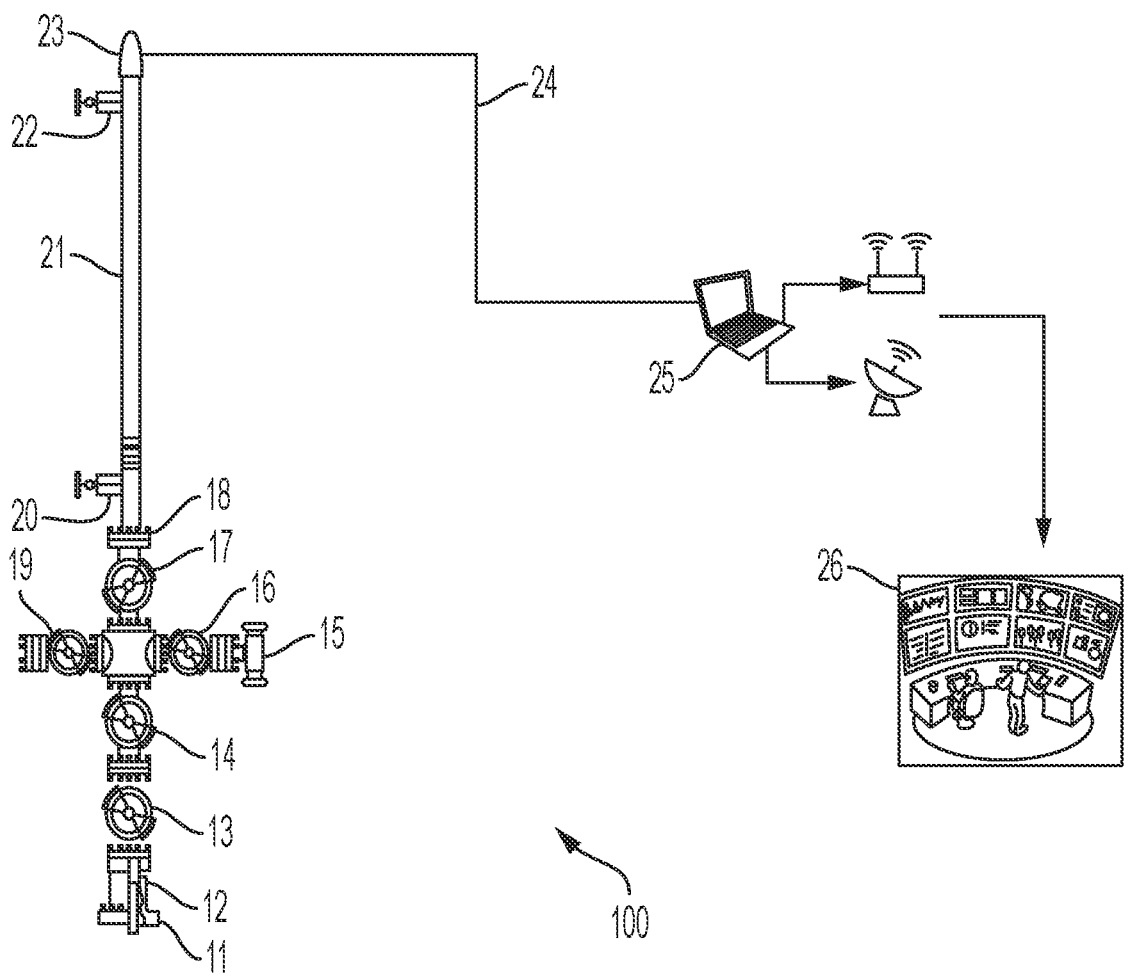
FIG. 3 is a general representation of the operational method of the invention, including the launching system (mast) of the RAU (not represented), connected to the well Christmas Tree, programming, managing and data collection unit, data system transmission and operation remote base.

The system 100 for launching, managing and control of the RAU and remote collection and transmission of data of autonomous tools operation for performing operations in oil and gas wells is illustrated in FIG. 3. FIG. 3 also illustrates the wellhead with its respective control valves, said wellhead being represented according to one embodiment of the invention by a Christmas Tree. In alternative embodiments, the wellhead is a casing head, a production head or still a Blow Out Preventer (BOP) equipment.

According to FIG. 3, the wellhead is composed of the Christmas Tree, comprising the production tubing 11, tubing hanger 12, a lower master valve 13, an upper master valve 14, a production choke 15, two side valves 16 and 19, a swab valve 17, a connector 18 for connection between the launching mast 21 and the said Christmas Tree.

The launching mast 21, which was the object of Brazilian Application BR102017017526-0 (corresponding international application PCT/BR2017050275 and U.S. Ser. No. 15/572,260) mentioned above, is connected to the Christmas Tree by means of connector 18. Said mast 21 is directed to the housing and launching of the RAU so that it can perform operations in the well. The insertion of the RAU in mast 21 is generally represented in FIG. 3. Additionally, it should be clear to the experts that the position of the RAU in mast 21 is not static, its position varying during the various steps of the launching into the well bore.

Mast 21 is provided with an End Cap 23 as interface between the RAU and unit 25 for management and data collection.

According to one embodiment, to End Cap 23 is connected an electric cable 24 in order to charge the RAU batteries and data collection and RAU programming by said unit 25 for programming, management and data collection. In an alternative embodiment said connection is wireless.

Said unit 25 for programming, management and data collection is in communication with a remotely positioned, monitoring and control central 26, for transfer of the collected data and reception of new schedules to perform operations in the well.

The robot autonomous unit (RAU) includes a logging tool (or a set of logging tools) designed for performing logging operations or a tool specially designed for installation and/or uninstallation of downhole equipment.

According to FIG. 3, the system 100 of the invention for launching, managing and controlling a robot autonomous unit for operations in oil and gas wells comprises:

a) an instrumented mast 21 for launching and withdrawal of the RAU, as described in Brazilian Application BR102017017526-0, said mast 21 being made up of a main body for housing the RAU, lower safety valve 20, upper safety valve 22, connector 18 for connection with the wellhead and End Cap 23 for communication with the RAU;

b) at the surface, unit 25 for programming, management and data collection, said unit comprising a portable computer with interface with End Cap 23 of mast 21. At the end of each operation, the operator, with the aid of said unit 25 makes the acquisition of the data collected by the robotic system, and the RAU is able to be directed to a new operation. In case of conclusion of all of the operations programmed for the well, unit 25 is uninstalled together with the launching system 100 and the RAU. Alternatively, said unit 25 for programming, management and data collection keeps connected to the End Cap 23 of mast 21 in case the RAU is permanently serving a single well; and c) a remote base or monitoring and control central 26 to receive information collected by said unit 25 for programming, management and data collection.

The transmission of information collected by said unit 25 for programming, management and data collection to said remote base or monitoring and control central 26 is effected by means of a remote transmission and reception data system. Said data transmission assures the communication between the system installed in the well location and the remote monitoring and control base 26, making it possible the control and operation actuation, as well as the monitoring of the RAU functionalities such as battery charge level, total operation time of the RAU, functionality tests of the RAU, etc. since the remote base 26. The communication between the unit 25 for programming, management and data collection and the remote base 26 is obtained by mobile cell phone service or by satellite.

According to the invention, the operational system 100 is directed to the launching, management and control of a robot autonomous unit for operations in oil and gas wells. In the invention, said autonomous unit or RAU being generally designed by reference number 200. It should be understood by the experts that such autonomous units are of general knowledge however the specific unit useful for the purposes of the invention is endowed with details which the Applicant considers relevant to the general understanding of the present invention.

The RAU 200 is the set of subsurface components that incorporate and conveys the logging tool 28 towards the interior of the well 10 in order to perform operations.

Figure 4:
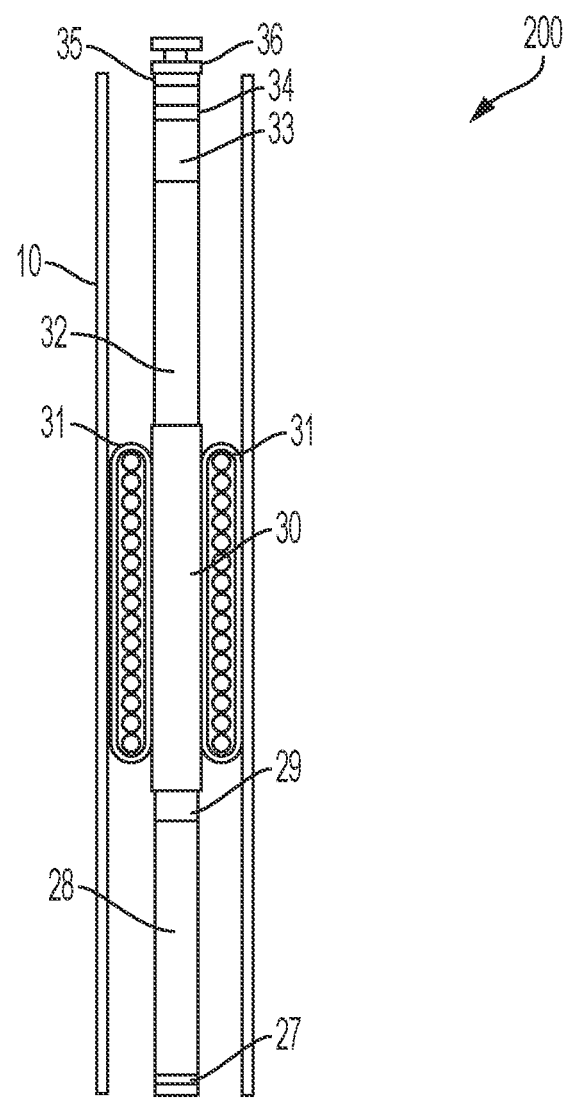
FIG. 4 is a scheme of the RAU operating in a cased well, with details of its components.
Figure 5:
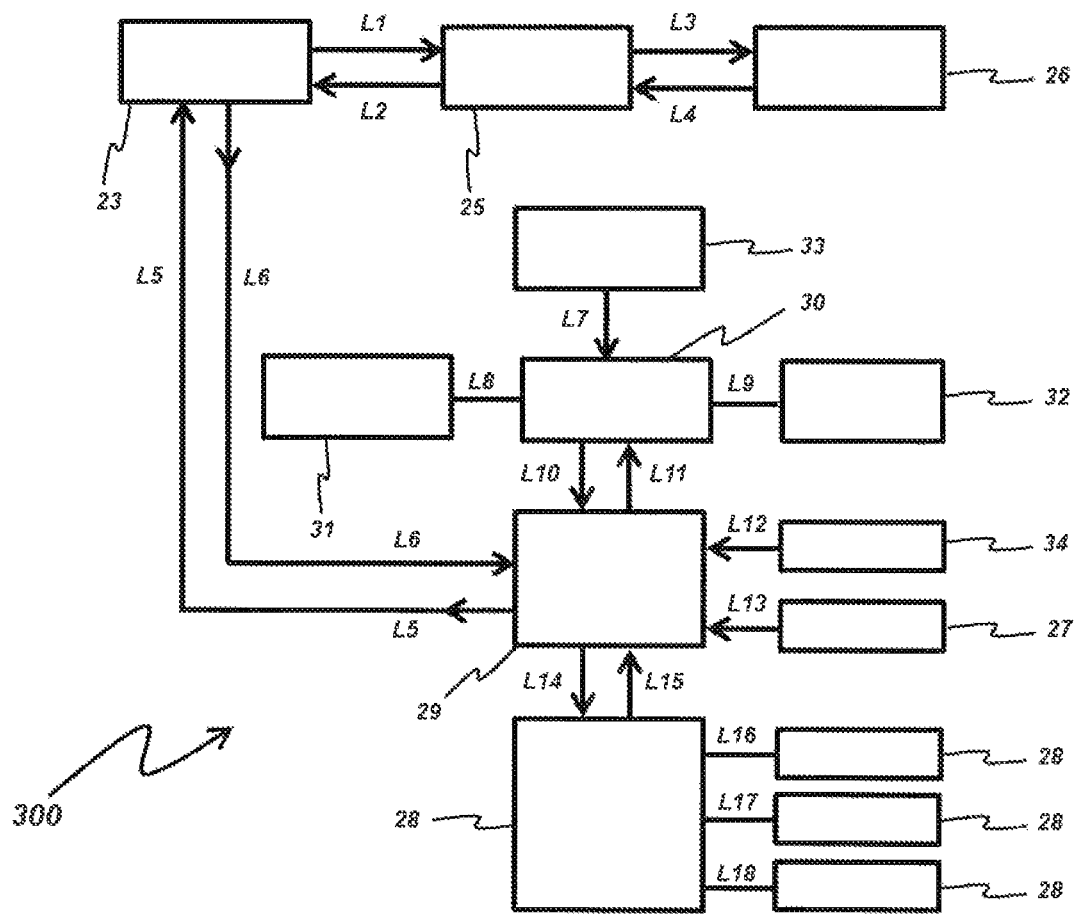
FIG. 5 is a flowchart of the Operational System for Launching, Managing and Control of the Autonomous Unit (RAU) for performing logging and other operations in oil and gas wells according to the invention.

The autonomous unit 200 is represented in FIG. 4.

Optionally the RAU 200 carries different devices for the installation and/or uninstallation of downhole equipment such as valves, bridge plugs and packers (not represented).

The RAU (200) comprises:

at least one power driven traction unit 30, able to self-adjust to the well 10 diameter, said unit being provided with caterpillar tracks 31 or any other known displacement means and being made up of a set of electrical motors and transmission components in a mechanical structure able to self-adjust to different diameters along the well 10. The mechanical structure operates by means of a set of springs or a retractable system so as to centralize the equipment and adapt same to the well 10 diameters along its path. Further, the traction power unit 30 includes a distance travelled meter (not represented) known in the industry, for finding the position of the RAU in the interior of well 10;

a processing and control unit 29 in charge of: i) data processing and controlling the robotic system, acquiring in real time data of all of the sensors on board of the RAU 200, including both the well diameter sensors 27 and 34 or any other sensors present in the logging tool pertaining to the RAU 200; and ii) processing the operations established by the programming unit 25 so as to enable the RAU 200 to operate in autonomous way;

a battery unit 33 in charge of the electrical supply of the RAU 200 and its components, made up of a set of rechargeable, high capacity electrical batteries able to provide the energy required for performing a complete RAU 200 operation in well 10;

a well diameter reconnaissance system, made up by a set of sensors 34, 27 which enables the identification of the well 10 diameter variation. Data collected by said sensors 34, 27 are conveyed towards the RAU 200 processing and controlling unit 29 for computational analysis and adaptation of the traction unit 30 to the diameter of the well 10 travelled section;

a buoyance compensation chamber 32 for aiding the robotic system to return to surface at the end of each operation, serving also as safety system for the return of the RAU 200 in passive way up to the launching mast 21;

a logging tool 28 including optionally a device for flow rate record (not represented) selected among any known means for flow rate measurement, such as flow rate meters by turbine, rotor, magnetic or thermal principle, orifice plates, Pitot tube, Coriolis or any other. The logging tool 28 includes optionally an electronic sensor (not represented) for pressure registration, selected among crystal sensor, MEMS sensor or any other of the kind, commercially available. Optionally the logging tool 28 includes an electronic sensor (not represented) for temperature registration, selected among crystal sensor, MEMS sensor or any other of the kind, commercially available for temperature measurement.

an interface 35 for contact between the RAU 200 with communication End Cap 23 of mast 21, in charge of data transmission between the RAU 200 and the Programming, Management and Data Collection 25; and a head or rescue tip 36 for recovery of the RAU 200 and lifting of same up to the surface in case of it being stuck in the interior of well 10 and in case of malfunction or damage.

The RAU 200 carries still optionally different logging tools or sensors of different working principles, such as radioactive, acoustic, electric, magnetic, optical or hydrodynamic principle, or yet a combination between same, for measurement and record of different physical properties of rocks and well.

The well 10 wall depicted in FIG. 4 is a casing, production or injection tubing, sand screen, liner or still a non-cased well wall, the section being vertical, horizontal or of any inclination and comprehending the depth interval since surface and up to the final depth of the well path.

The Power-Driven Traction Unit 30, Processing and Control Unit 29 and Logging Tool 28 are interlinked and make the so-called RAU 200 active system.

The logging tool 28 is a pressure, temperature or flow meter, or any combination of same, as well as any other logging tool, operating either by electrical, radioactive, acoustic, magnetic or optical principle, or still a combination of these principles and are part of the RAU system.

The item designed by reference number 28 is still a tool for installation and or uninstallation of subsurface equipment, either as valves, bridge plugs, packers or any other equipment of the production tubing, casing or still, open-hole well.

Lower 27 and upper 34 sensors coupled respectively to the lower and upper ends of RAU 200 are intended to the recognition of the well 10 diameter, said sensors 27, 34 being well-known in the industry and being selected among those operated by acoustic, magnetic, optical or any other principle commercially available.

Said upper 34 and lower 27 recognition sensors convey information to the Processing and Control unit 29 of the RAU 200 for the control of expansion or retraction of the Caterpillar System 31 (or any other known locomotion system) of the Power-Driven Traction Unit 30 so as to enable the RAU 200 to move along different well 10 diameters.

The lower 27 and upper 34 well diameter recognition devices (sensors) combined to the retractable locomotion system or caterpillar system 31 allow the RAU 200 to cross different diameters sections along the well path, so as to allow crossing within production or injection strings, casing and open hole wall.

The interface 35 provided in the upper portion of the RAU 200 is intended for electronic connection of the RAU 200 with End Cap 23 of mast 21 (FIG. 3). End Cap 23 is in charge of the connection and data transmission between the RAU 200 and the programming, management and data collection unit 25.

At the upper end of RAU 200 a rescue head or tip 36 is connected for recovery of the RAU 200 in case of stucking or malfunctioning, as is described in Brazilian Application BR102017017526-0 (corresponding international application PCT/BR2017050275 and U.S. Ser. No. 15/572,260).

The connection between the various elements of the RAU 200 is obtained by means of threads or any other mechanical connection with electrical contact, such kind being well-known in the industry.

And the well logging method with the aid of the system of the invention is as follows:

a) According to FIG. 3, housing, with the mast 21 upper safety valve 22 open while the lower safety valve 20 and the swab valve 17 are kept closed, the RAU 200 within mast 21;

b) After data being obtained by logging tool 28, connecting the programming, management and data collection unit 25 to End cap 23 of mast 21 by means of a cable 24 or otherwise by wireless connection;

c) The programming, management and data collection unit 25 is in charge of:
   i) programming the tasks to be performed by RAU 200; and
   ii) collecting the data recorded and stored in the memory of the RAU 200;

d) Establishing contact between said programming, management and data collection unit 25 and RAU 200 after installing End Cap 23 on the upper end of mast 21, and thereafter conveying the tasks scheduled to be performed in the well to processing unit 29 of RAU 200;

e) opening the lower safety valve 20 of mast 21 and the swab valve 17 of the Christmas Tree and letting the RAU (200) to cross towards the bottom of well 10 for performing the tasks for which it was programmed, either logging operations or installation or uninstallation of downhole equipment, the RAU being displaced along the production or injection tubing, casing or open-hole well, up to the desired depth for the operation, and then closing the lower safety valve 20 of mast 21;

f) Upon return of the autonomous unit RAU 200 to the surface and at close proximity to lower safety valve 20, automatically opening said valve, and closing said safety valve 20 and swab valve 17 after entry of the RAU 200 into mast 21, g) Upon continuing its ascending path along the main body of mast 21, housing the RAU 200 inside the End Cap 23;

h) Collecting, with the aid of the programming, management and data collection unit 25 connected to the End Cap 23 of mast 21 the data obtained by RAU 200 and registered in the memory of processing unit 29 during the operation in well 10;

i) Conveying the data registered by RAU 200 and collected by the programming, management and data collection unit 25 to a remote base 26 by means of a mobile cell phone signal or by satellite.

U.S. Pat. No. 9,528,348 B2 and other patent documents cited hereinbefore in the present disclosure, the present invention advances a well logging method with the aid of an operational system for launching, operation, collection and register of data provided by robot autonomous units (RAU), the system advantageously dispensing with the need of wireline, coiled tubing or drill pipe, so as to enable operation with the well under flow, the well diameter being optionally variable along the path of the robot autonomous unit, the well being or not equipped with a production tubing 11:

a) The Processing and Control Unit 29 of RAU 200 both receives (via L6) and conveys (via L5) information to the Programming, Management and Data Collection Unit 25 by means of End Cap 23 of Mast 21, said End Cap 23 establishing communication between Units 29, 25 (via L1 and L2);

b) Said Programming, Management and Data Collection Unit 25 receives (via L4) and conveys (via L3) information to a Operation Monitoring and Control Central 26 (remote base) by means of mobile cellular telephone signal or by satellite;

c) The Processing and Control Unit 29 of RAU 200 both receives information (via L15) and conveys instructions (via L14) to the Logging Tool 28;

d) The Logging Tool 28 is connected to flow rate, pressure and temperature sensors via L16, L17 and L18;

e) The Processing and Control Unit 29 of RAU 200 receives information from Upper Diameter Sensor 34 via L12 and Lower Diameter Sensor 27 via L13;

f) The Power Driven Traction Unit 30 is mechanically connected to a conveyor belt system 31 (or any other locomotion system) via L8 and to the Thrust compensation Chamber 32 via L9; and g) The set of Electrical Batteries 33 supplies via L7 electrical energy, to the RAU 200 active system (items 37, 34, 30, 29, 28).

We claim:

1. An operational system for launching, managing and controlling a robot autonomous unit (RAU) for operations within a wellhead in oil and gas wells, wherein said system comprises:

a mast for the launching and housing of a robot autonomous unit (RAU) for operations in oil and gas wells, said mast including a main body for housing the RAU, a lower safety valve, an upper safety valve, an end cap, and a connector for connection with the well head and said end cap for communication with said RAU;

programming, management and data control (PMD) unit, an interface between said PMD unit and said RAU being performed by said end cap of said mast; and at the ground surface, a control central unit for remote transmission and reception for receiving the information collected by said PMD unit, and said system being operated comprising the steps of:

a) providing a processing and control unit of RAU that both receives and conveys information to the PMD unit by the end cap of said mast, said end cap establishing communication between said processing and control unit and said PMD unit;

b) said PMD unit receives and conveys information to said control central unit by a mobile cell phone signal or by satellite;

c) said processing and control unit of said RAU both receives information and conveys instructions to a logging tool;

d) said logging tool includes flow rate, pressure and temperature sensors;

e) The processing and control unit of RAU receives information from an upper diameter sensor and a lower diameter sensor;

f) providing a power driven traction unit mechanically connected to a conveyor belt system and to a thrust compensation chamber; and g) providing electrical batteries and supplying electrical energy, to the RAU.

2. A method for well logging, wherein said method comprises the steps of:

a) providing a launching mast, and upper safety valve, a swab valve, a lower safety valve, the upper end of said launching mast being supplied with an end cap;

b) providing battery-powered robotic autonomous unit, a programming, managing and data collection (PMD) unit for programming the operations to be performed by the RAU and for collecting the data registered and stored in the memory of said RAU;

c) connecting the said launching mast to said well Christmas Tree by a connector;

d) housing the RAU within the interior of the mast, with the upper safety valve open and both the lower safety valve and the swab valve closed;

e) connecting said end cap to an electric power supply system for charging the batteries of the RAU;

f) establishing contact between the PMD unit and the RAU and conveying to the processing unit of the RAU the program of the operations to be performed in the well;

g) opening the lower safety valve of mast and the swab valve of the Christmas Tree to allow the RAU to move towards the well bottom to perform the operations for which it has been programmed, including logging operations or installation and uninstallation of subsurface equipment, the RAU being able to move along a well production or injection string, casing or open well, up to the well bore depth desired for the operation;

h) automatically opening the lower safety valve when the RAU returns to surface and closing said safety valve after the entry of said RAU into said mast;

i) ending an ascending path of said RAU along the main body of mast by housing said RAU in said end cap;

j) collecting data obtained by said RAU, stored in the processing unit memory during the well operation; and k) conveying data recorded by said RAU and collected by said PMD unit for programming, managing and data collection towards a remote base positioned at the surface.

* * * * *